United States Patent [19]
Waldin, Jr. et al.

[11] Patent Number: 6,052,531
[45] Date of Patent: Apr. 18, 2000

[54] MULTI-TIERED INCREMENTAL SOFTWARE UPDATING

[75] Inventors: Ray Soon Waldin, Jr., Los Angeles; Carey Nachenberg, Northridge, both of Calif.

[73] Assignee: Symantec Corporation, Cupertino, Calif.

[21] Appl. No.: 09/047,949

[22] Filed: Mar. 25, 1998

[51] Int. Cl.$^7$ .................................................. G06F 15/173
[52] U.S. Cl. ............... 395/712; 395/200.33; 395/200.49; 707/10; 707/203
[58] Field of Search ................ 707/203, 10; 395/200.33, 395/200.49, 712

[56] References Cited

U.S. PATENT DOCUMENTS

| | | | |
|---|---|---|---|
| 5,155,847 | 10/1992 | Kirouac et al. | 709/221 |
| 5,182,806 | 1/1993 | McKeeman et al. | 395/707 |
| 5,204,960 | 4/1993 | Smith et al. | 395/707 |
| 5,495,610 | 2/1996 | Shing et al. | 709/221 |
| 5,519,866 | 5/1996 | Lawrence et al. | 365/710 |
| 5,566,335 | 10/1996 | Nash et al. | 713/1 |
| 5,581,764 | 12/1996 | Fitzgerald et al. | 395/703 |
| 5,673,387 | 9/1997 | Chen et al. | 714/38 |
| 5,699,275 | 12/1997 | Beasley et al. | 709/221 |
| 5,799,189 | 8/1998 | Koser et al. | 709/300 |
| 5,893,113 | 4/1999 | McGrath et al. | 707/200 |
| 5,905,896 | 5/1999 | Delannoy | 395/712 |
| 5,909,581 | 6/1999 | Park | 395/712 |
| 5,933,647 | 8/1999 | Aronberg et al. | 395/712 |
| 5,960,204 | 9/1999 | Yinger et al. | 395/712 |

FOREIGN PATENT DOCUMENTS

WO 96/32679  10/1996  WIPO .............................. G06F 13/00

OTHER PUBLICATIONS

Am Suk Oh et al., "An incremental update propagation scheme for a cooperative transaction model", Proc. 7th Intl. Workshop on DB and expert systems Appl., Abstract Only, Sep. 1996.

Grundy et al., "Support for collaborative, integrated software development", Proc. 95 Software Engineering Environments, Abstract Only, Apr. 1995.

Pollock, Lori, "Incremental version of iterative data flow analysis", IEEE Trans Software Eng, v 15, n12, Abstract Only, Dec. 1989.

Hedin, Gorel, "Incremental Execution in a programmin Environment based on Compilation", Proc. of Hawaii Intl. Conf. on System Sciences, Abstract Only, Jan. 1986.

Pocket Soft, ".RTPatch® Professional for Windows, NT, and DOS Binary Update System", pp. 1–6, Jun. 23, 1998, http:\\www.pocketsoft.com\whtwind.html.

Hurwitz Group, "Application Management for Distributed Applications", pp. 1–7, Jun., 1998.

"User–Friendly Interface for Applying Specific Levels of Coordinated Updates to Software in the Field", IBM Technical Disclosure Bulletin, vol. 31, No. 10, Mar. 1989, Armonk, NY, U.S.A.

*Primary Examiner*—Jean R. Homere
*Attorney, Agent, or Firm*—Fenwick & West LLP

[57] ABSTRACT

A software application (110) is updated to a newer version by means of incremental update patches (122). The incremental update patches (122) each contain that information necessary to transform one version of an application to another version. Any version of an application (110) may be upgraded to any other version of the application, through the use of a series of incremental update patches (122). The appropriate incremental update patches (122) are distributed in a multi-tiered manner, such that some update patches (122) update the application (110) by only one version, and others update the application (110) by several versions.

22 Claims, 7 Drawing Sheets

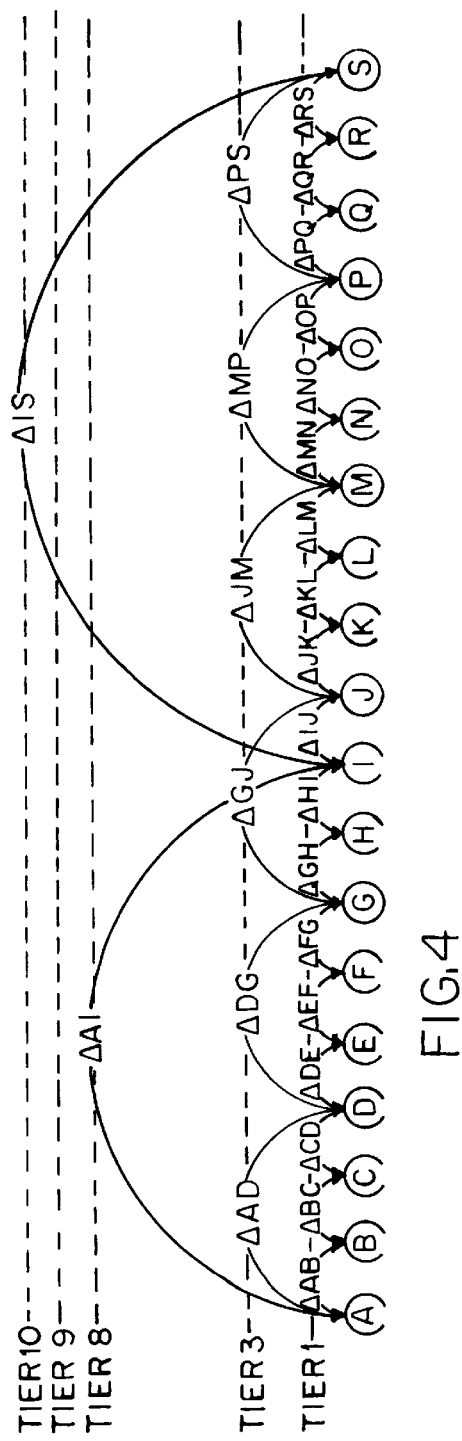
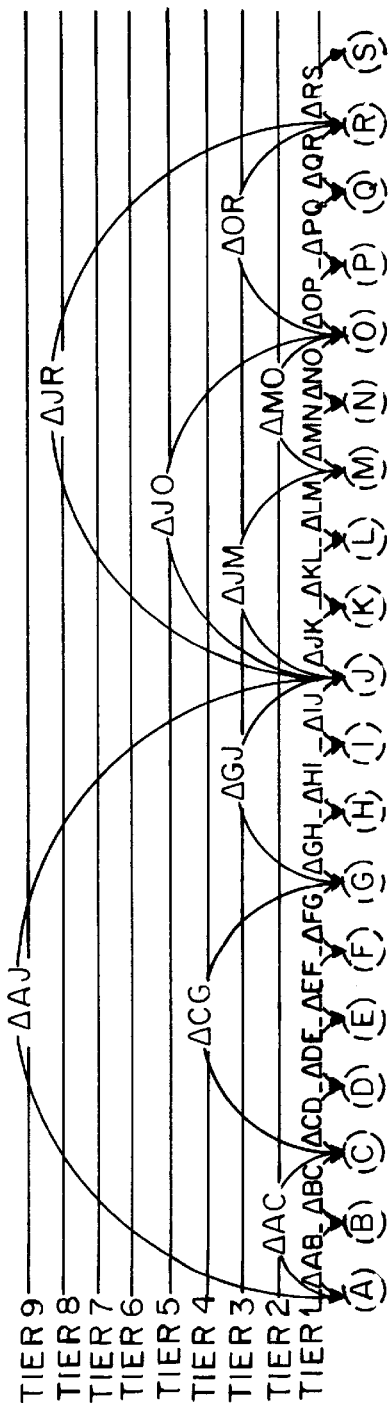
FIG. 4
FIG. 5

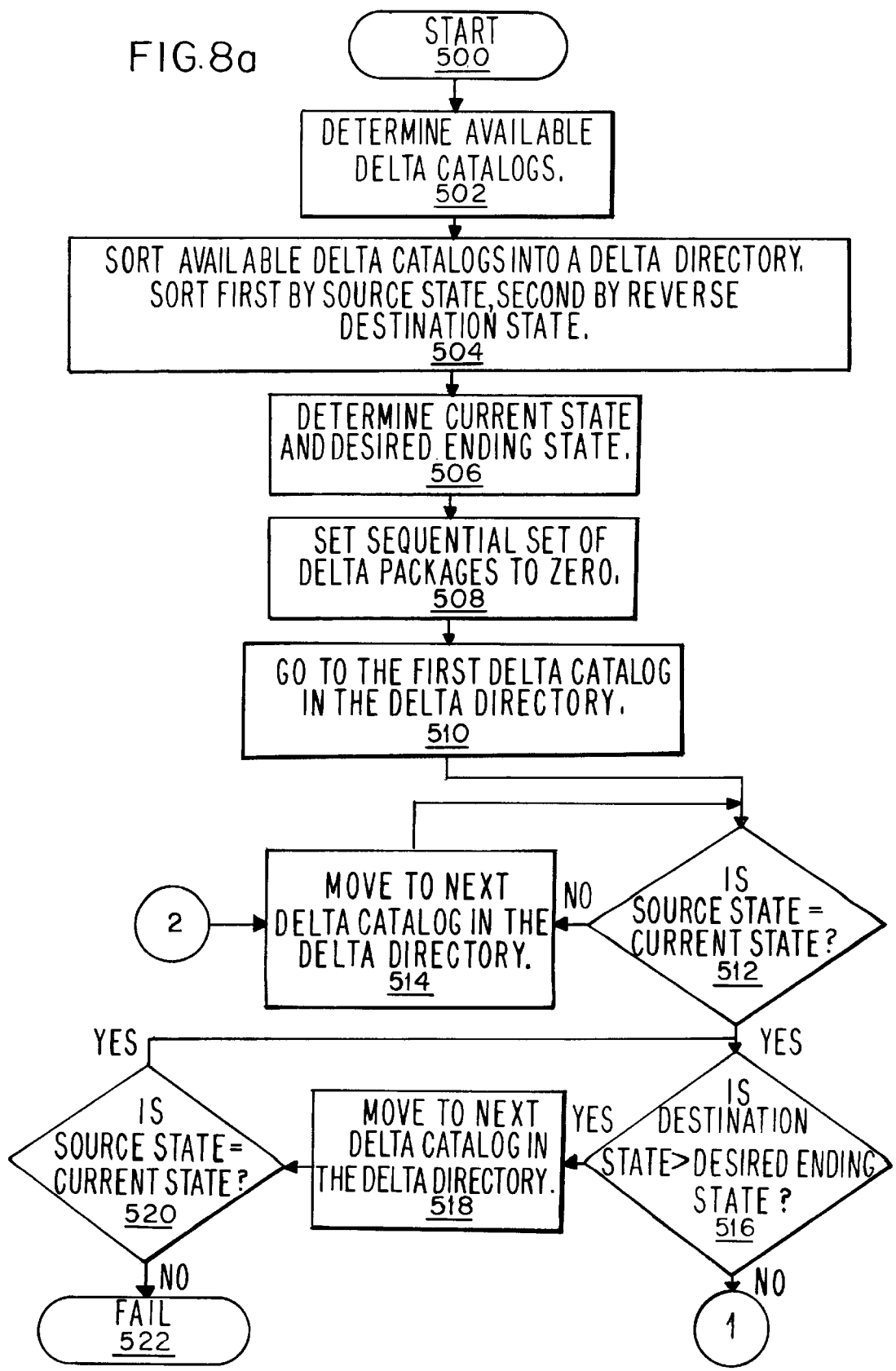

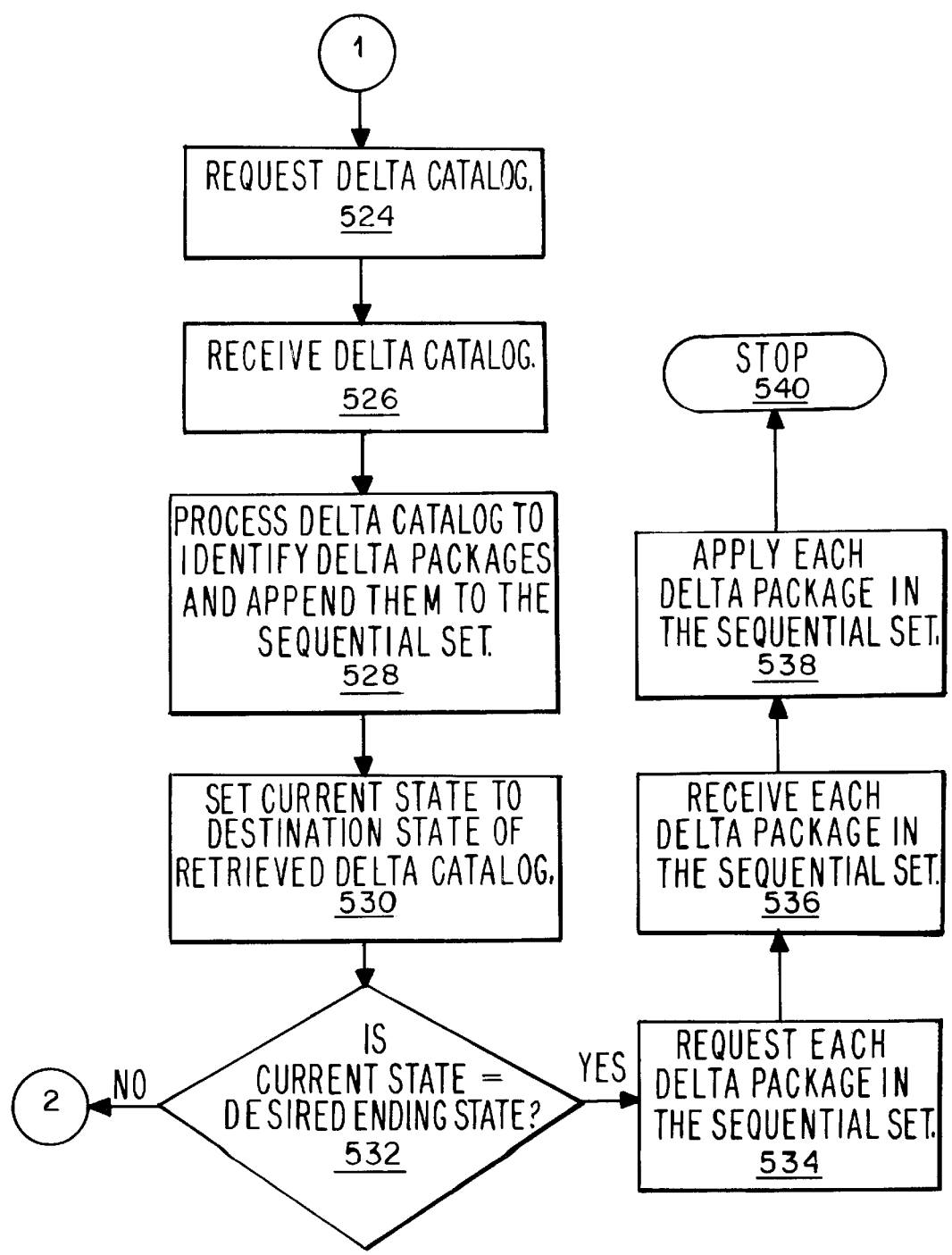

MULTI-TIERED INCREMENTAL SOFTWARE UPDATING

BACKGROUND OF THE INVENTION

1. Field of the Invention

The present invention relates generally to incremental software updating, and more specifically to a system and method for using an automated, multi-tiered approach to performing incremental software updates.

2. Description of Background Art

Some computer software publishers update their software "applications" (computer programs and data files associated with the programs) frequently. For some types of software applications, such as virus protection software, these updates are particularly frequent. Virus protection software applications are designed to detect computer viruses on a computer system, and may also remove viruses which are found. An example of such a software application is Norton Anti-Virus, published by Symantec Corporation of Cupertino, Calif. Because these virus protection software applications rely on data about specific viruses, and new viruses are constantly being written to avoid current virus detection capabilities, it is necessary to update virus protection software applications on a regular basis to account for the newest viruses. Frequent updating of data files is also necessary for some database publishers, who must put up-to-date information in their databases, and remove obsolete information therefrom. Periodic updating of general software applications to expand capabilities and eliminate "bugs" is also common.

Currently, several methods are used to update software applications. The simplest of these is to distribute one entire software application to replace an older one. This method, the "full update" method, is simple, but expensive and inconvenient. Typically the software is distributed on some type of removable media, such as floppy disks or CD-ROMs, which are costly to produce and distribute. The time an end user must wait for the removable medium to arrive and the time it takes for the software application to install itself on a computer system are inconvenient. This inconvenience is compounded where updates occur frequently. Because of the large size of software applications it is generally not feasible to distribute such updates over computer networks, such as the Internet. When full updates are distributed over the Internet, they often cause such high loads on servers that other users suffer slow-downs on the network, and the servers have trouble meeting the demands.

In order to bypass many of the problems associated with this type of software updating, some software publishers distribute "incremental updates." These updates do not contain entire software applications, but rather only that information necessary to transform a given version of a software application to a newer version. Among the methods available to perform such incremental software updating is binary patching, performed by programs such as RTPatch, published by Pocket Soft, Inc. A binary patcher replaces only those binary bits of a software application which are different in a newer version. Because most software updates involve changes to only a small portion of a software application, a binary patcher needs, in addition to the old software application, only a small data file including the differences between the two versions. The smaller data files distributed for a binary patch update are often less than 1% of the size of a full update, taking advantage of the large amount of redundancy in the two versions.

The use of incremental update methods allows for smaller updates which can be distributed by means that are not conducive to the distribution of full updates, such as distribution over the Internet. The smaller incremental updates also make distribution by floppy disk more feasible where a full update would have required many disks, and an incremental update may require only one. However, incremental update methods introduce another problem: the incremental update is specifically useful for updating only one particular version of a software application to another particular version. When updates occur frequently, as with virus protection software applications, end users may often update from an arbitrarily old version to the newest version, skipping over several previously released versions. An incremental update for the newest version of a software application will update only from the most recent version, however.

One solution to this problem has been for software publishers to group a number of binary patch data files together into one distribution. The user of an arbitrarily old version can then apply each incremental update, one at a time, to update to the newest version. However, the number of incremental updates may be large, due to the fact that the grouping covers a large number of versions. The benefits of smaller distributed update files begin to disappear, as the size of the grouped-together incremental updates grows. This method of updating applications can also be cumbersome, as a series of update patches need to be selected from the group and applied to the software application one after another.

Another solution to the problem of incremental update version-specificity has been to create a unique patch file for transforming every previous version of the application to the most current version. Some users may not wish to update their software applications to the most current version, however, for a number of reasons. Some may be within a corporate setting, where an information services department allows updates only to versions it has had a chance to test and approve. Others may have older computer systems which do not support the increased resource requirements of the newest version of an application. For these reasons, publishers of software updates using this method must generally keep updates available from every previous version of an application to a large number of more recent versions. This results in a geometrically growing number of update patch files to produce, store and maintain for users. In the case of publishers who update their applications frequently, such as publishers of virus-protection software applications, this may quickly become untenable.

One alternative to the methods described above is the use of "push" technology, in which servers maintain databases of what versions of a software application each user has. The servers then send the necessary updates to each user, as they become available. This system requires "smart" servers, however, to monitor user configurations, determine what each user needs, and send the appropriate update information. This results in a server-intensive system which can cause a drain on server resources comparable to that experienced in the full update scheme, when many users are simultaneously requesting full updates.

What is needed is a system for updating software applications from an arbitrary first version to an arbitrary second version which does not require a large amount of information to be stored and maintained by a software publisher, does not require the user to acquire a large amount of data to perform such an update, and does not require the use of "smart" servers.

SUMMARY OF THE INVENTION

The present invention is a method and apparatus for distributing the appropriate incremental software update information to users. A software publisher (118) provides update patches (122) which will update users' software applications (110) from one state to another. The update patches (122) are 'tiered.' Update patches on the first tier (200) update from a given application state to the subsequent application state. Update patches on the second tier (202) update an application from a given state to the state which is two versions later. The tier of an update patch indicates how many individual updates are spanned by the patch.

By selectively providing tiered update patches, software publishers (118) can facilitate quick, efficient updating of users' applications (110) without producing and maintaining large numbers of update patches (122). These update patches (122) may be provided to users simultaneously through a variety of distribution channels (124), since a "smart server" is not necessary to provide users with the needed update patches (122). This allows for selective redundancy, as update patches (122) which are likely to be needed by many users may be made available through more of the available distribution channels (124) than others, providing a robust distribution system.

BRIEF DESCRIPTION OF THE DRAWINGS

These and other more detailed and specific objects and features of the present invention are more fully disclosed in the following specification, reference being had to the accompanying drawings, in which:

FIG. 4 is an illustration of an example of a sub-optimal software application update using incremental updates.

FIG. 5 is an illustration of an example of a publishing schedule for multi-tiered incremental updates which meets the necessary condition for optimal updates according to the present invention.

FIGS. 8a and 8b are a flowchart showing how an updating program determines what update patches need to be applied to effect an update, and how the updating program carries out the updating.

DETAILED DESCRIPTION OF THE PREFERRED EMBODIMENTS

In one embodiment, the present invention may be implemented as an update mechanism for a virus protection software application. In other embodiments, the present invention may be used to update general computer readable files, which may include data files, program files, database files, graphics files, or audio files. For illustrative purposes only, the invention will be described as embodied in an update mechanism for virus protection software.

Figure 1:
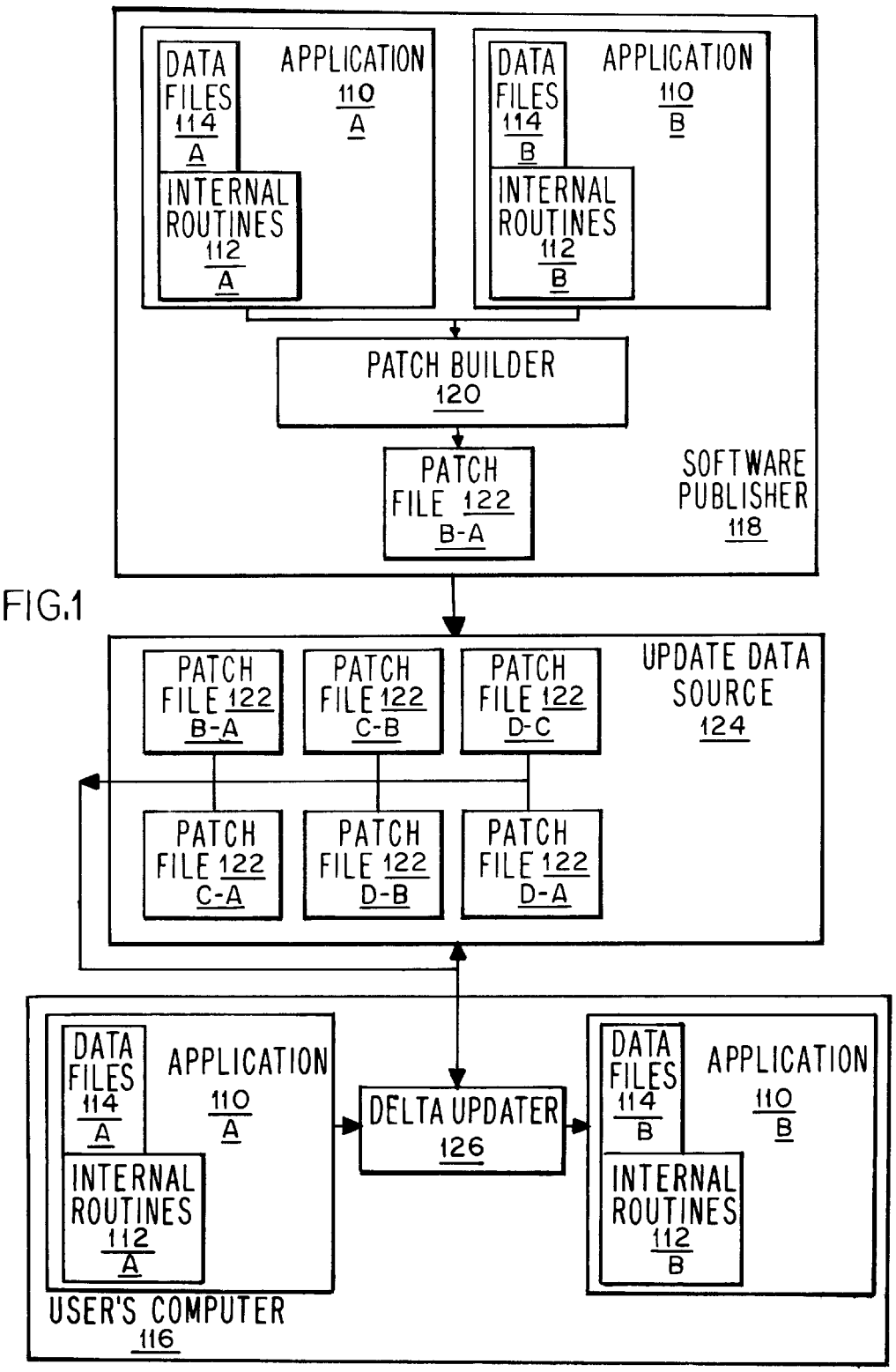
FIG. 1 is a block diagram of a first embodiment of the present invention, in which a software application 110 on a user's computer 116 is updated with incremental update patches 122 from a remote source 118.

Referring to FIG. 1, a virus protection software application 110 which incorporates a number of virus detecting routines 112, and utilizes a number of data files containing virus information 114, is installed on a user's computer 116. Because of the rate at which new viruses are created, it is desirable to update the virus protection software applications on the user's computer frequently. These updates could take place as often as daily, or even more frequently if desired. Generally, these updated applications 110 will include only small changes to the data files 114, but sometimes larger changes to the virus detecting routines 112 will also be included.

In order to fully describe the embodiment of the present invention, it is first necessary to describe DeltaPackages, DeltaCatalogs, and DeltaDirectories.

DeltaPackages

Each time an updated software application 110 is produced by the virus protection software publisher, the updated form of the software application constitutes a new version. The software publisher uses an incremental update builder, such as binary patch file builder 120, to produce at least one incremental update, such as binary patch file 122, which can transform a previous version of the software application to the current version. A binary patch file builder 120 is a program which takes two versions of a software application, for example versions A and B, and produces a binary patch file, 122, which can be used with version A of the software application to produce version B. In this example, version A would be the "source" state and version B would be the "destination" state of the application. This binary patch file 122 can either be an executable file which acts directly on version A of the software application, or it can be a data file which is used by a separate binary patch program (not shown) to transform version A of the software application to version B. The binary patch files 122 are stored on an update data source 124 (a "server") which makes the patch files 122 available to an updater program 126 (a "client"). The updater program 126 determines what patch files 122 are necessary, retrieves them and applies them to the application to be updated 110. In the illustrative embodiment, the incremental update files are binary patch files which are digitally signed compressed executable modules, and the Java ARchive (JAR) platform-independent file format, available from Sun Microsystems, is used for this purpose. Because they are digitally signed, the authenticity of the updates can be ensured. When executed, the incremental update file automatically transforms a software application from a source state to a destination state. These self-contained executable incremental update files conforming to the JAR format are referred to as "DeltaPackages" 122, and are one example of what is referred to herein as an "update patch".

Figure 2:
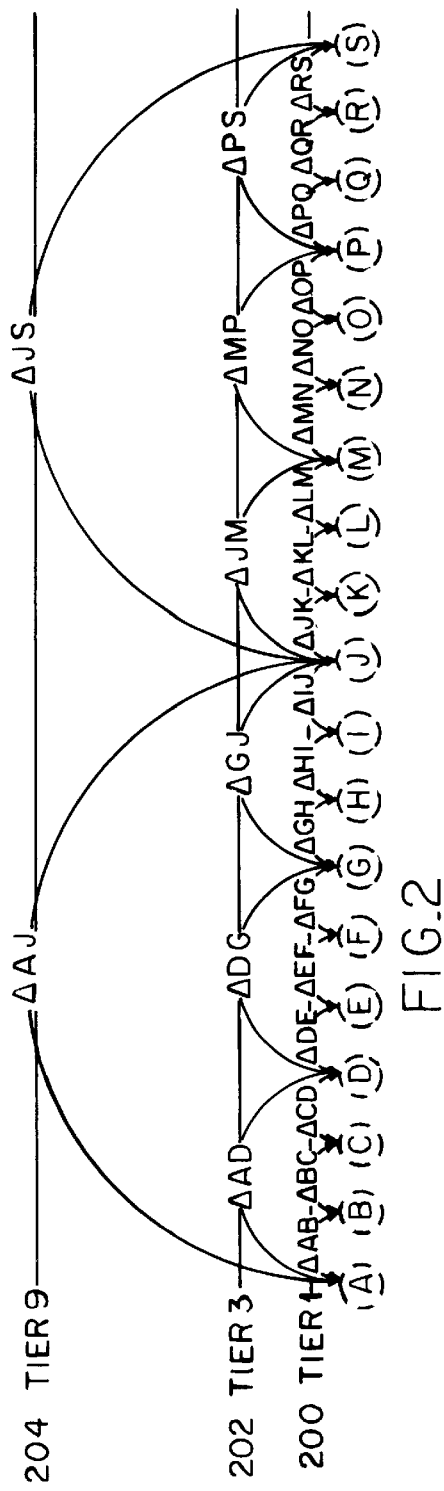
FIG. 2 is an illustration of the relation of various tiers of updates to a series of application states in the present invention.

In FIG. 2, a series of application states are given, designated state A through state S. Each application state is a software application version which is produced by the software publisher later in time than a version with an alphabetically earlier letter designation. The DeltaPackages 122, which are referred to as "tier 1" DeltaPackages 200, are so named because they each effect a transition from an application state which is only one version earlier than the destination state. There is a tier 1 DeltaPackage 200 for updating to each application state other than the initial application state, A. The software publisher may produce higher tier DeltaPackages 122, such as "tier 3" DeltaPackages 202 and "tier 9" DeltaPackages 204. A tier 3 DeltaPackage 202 is used to transform an application from a source state three versions earlier than the destination state, and a tier 9 DeltaPackage 204 is used to transform an application from a source state nine versions earlier than the destination state. Many other tiers of DeltaPackages 122 may be produced, but the benefits of additional tiers must be weighed against the costs, described below. In FIG. 2, tier 1 DeltaPackages 200 are produced for each new version, tier 3 DeltaPackages 202 are produced for every third version, and tier 9 DeltaPackages 204 are produced for every ninth version.

For illustrative purposes, each DeltaPackage 122 is given a designation which is "Δ" followed by two letters. The first letter indicates the application source state upon which the DeltaPackage 122 works and the second letter indicates the application destination state produced. For the case where there are not multiple "flavors" of the application which need to be updated in parallel, a relatively simple process is employed to update the application. DeltaPackages 122 are applied to a user's software application incrementally, beginning with the highest tier DeltaPackage 122 available which has a source state equal to the current state of the application, and a destination state no later than the desired ending state. After the DeltaPackage 122 is applied, and the application is updated to the destination state of the DeltaPackage 122, another DeltaPackage 122 is chosen in the same manner, with the new application state providing the source state of the next DeltaPackage 122. This continues until the desired ending state of the application is reached.

Figure 3:
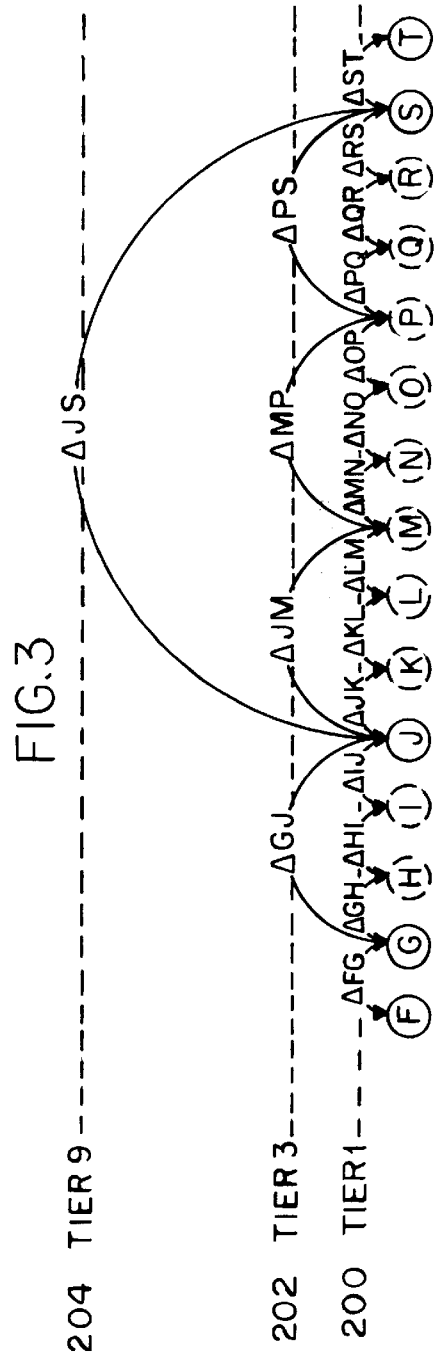
FIG. 3 is an illustration of an example of the use of multi-tiered incremental updates to perform a software application update according to the present invention.

FIG. 3 illustrates this procedure for a case in which it is desired to transform an application of state F to an application of state T. Following the procedure described above, such a transformation is accomplished through only four incremental updates, from F to G to J to S to T. Each time a new DeltaPackage 122 is to be selected, the one chosen is the highest tier DeltaPackage 122 with the current application state as a source state, and a destination state which does not exceed the desired ending state.

When fewer incremental updates are required to perform a given transformation, fewer DeltaPackages 122, and therefore less information, needs to be transferred to the application. The procedure described above produces a desired transformation using the smallest number of available DeltaPackages 122, as long as one condition is met: no available DeltaPackage 122 may have a source state which is between the source and destination states of an available DeltaPackage 122 with a lower tier. As long as this condition is met, then the procedure described above will perform an optimum transformation, using the smallest number of available DeltaPackages 122 to get from the beginning state to the desired ending state. If the condition is not met then the procedure described above may result in a transformation which uses more of the available DeltaPackages 122 than necessary. An example of a sub-optimal transformation is illustrated in FIG. 4. In that case, a transformation from state G to state S uses four DeltaPackages 122 (ΔGJ, ΔJM, ΔMP and ΔPS), when it need only use three (ΔGH, ΔHI, and ΔIS). Because the ΔIS DeltaPackage 122 has a source state (I) which is between the source and destination states of a lower tier DeltaPackage (ΔGJ), the ΔIS DeltaPackage 122 violates the above condition, and a sub-optimal set of DeltaPackages 122 is used. In practice, a software publisher may easily ensure that the available DeltaPackages 122 meet this condition, since each DeltaPackage 122 is produced later in time than DeltaPackages 122 with earlier destination states. In the above example, before issuing DeltaPackage ΔIS, the publisher would eliminate DeltaPackage ΔGJ and possibly replace it with another, such as DeltaPackage ΔGI.

In the example of FIG. 3, if only the tier 1 DeltaPackages 200 had been available, fourteen DeltaPackages 122 would have been required for the transformation, instead of four, and much unnecessary information would have been transferred to the application. The total number of DeltaPackages 122 which would have been produced by the publisher, however, would have been smaller, the higher tier DeltaPackages 122 not having been produced. On the other hand, if a tier 14 DeltaPackage 122 designated ΔFT had been available, only one DeltaPackage 122 would have been required, and very little information would have been transferred to the user. However, the availability of a DeltaPackage 122 which accomplishes any particular transformation in one step can be assured only by producing individual DeltaPackages 122 from every source state to every destination state, which requires a number of DeltaPackages 122 approaching N! (where N is the number of file states). Producing and maintaining such a large number of individual DeltaPackages 122 is not feasible in many situations, as explained above. These considerations must be considered by a software publisher in determining the most efficient DeltaPackage 122 publishing schedule. For the illustrative embodiment, it was determined that providing DeltaPackages 122 of tiers 1, 3 and 9 would be most efficient.

The tiers of DeltaPackages 122 produced do not need to be published according to any fixed schedule, but rather may be determined as new updates become available. In FIG. 5 an irregular publishing schedule of DeltaPackages 122 is shown. There are four separate tiers of DeltaPackages 122 available with J as a source state. The decision to create so many DeltaPackages 122 with the same source state may be based on the fact that many copies of the application in the J state are known to be at large. Many publisher-specific, application-specific, and information transport mechanism-specific factors will affect the desirability of a publishing schedule for DeltaPackages 122.

DeltaCatalogs

Software publishers often produce different "flavors" of a single software application, directed to different computer architectures, different operating systems, and users who speak different languages. The scheme for publishing incremental updates laid out above is adequate for the case in which there is only one flavor of a software application. For the more general case of several application flavors, however, some additional mechanisms can be used to handle the additional complexities of parallel updating. A system which addresses these complexities is described in the second illustrative embodiment of the present invention.

In the case of virus definition updates, there are often updates which are not operating system-specific, and sometimes there are updates which are not even computer architecture-specific. Other times, updates are specific to these, and other, categories. A single update DeltaPackage 122 may be useful to update some flavors of an application, but not others. To handle these complexities, update catalogs, referred to as "DeltaCatalogs," are utilized. These update catalogs are another example of what are referred to herein as "update patches." Rather than having a single DeltaPackage 122 correspond to each incremental update (i.e. "ΔIS") as above, a DeltaCatalog corresponds to each incremental update (i.e. "ΔIS"). Each DeltaCatalog has an associated source state and an associated destination state, and specifies the necessary update information by specifying which DeltaPackages 122 should be used by each flavor of the application to update from the source state to the destination state. In one embodiment, DeltaPackages 122 are given unique IDs which do not conform to the "ΔAB" format used above for illustrative purposes, and are specified by the DeltaCatalogs using these unique IDs. With Delta-Catalogs substituted for DeltaPackages 122, the general scheme described above is utilized.

There are a number of different ways DeltaCatalogs can be implemented. In this embodiment, the Extensible Markup Language (XML) standard is used to create a document type definition. The XML standard is available from W3C Publications, World Wide Web Consortium, Massachusetts Institute of Technology, Laboratory for Computing Sciences, NE43–356, 545 Technology Square, Cambridge, Mass. 02139. An example document type definition corresponding to the XML standard, referred to as DPML (for DeltaPackage Markup Language), is given in Appendix A. In this document type definition, there are a number of types of entries a DeltaCatalog may contain. These types are Product (the type of software application), Package (a specific DeltaPackage 122), OS (operating system), CPU (computer architecture) and Language (the language spoken by the users of the software application). An entry of any of these types except Package may in turn contain entries of the types Product, Package, OS, CPU or Language. None of the entry types may contain a DeltaCatalog, and the Package must contain an "ID" which corresponds to a specific DeltaPackage 122. Also, the "to", or destination state, data field and the "from", or source state, data field must be given for a DeltaCatalog.

Figure 6:
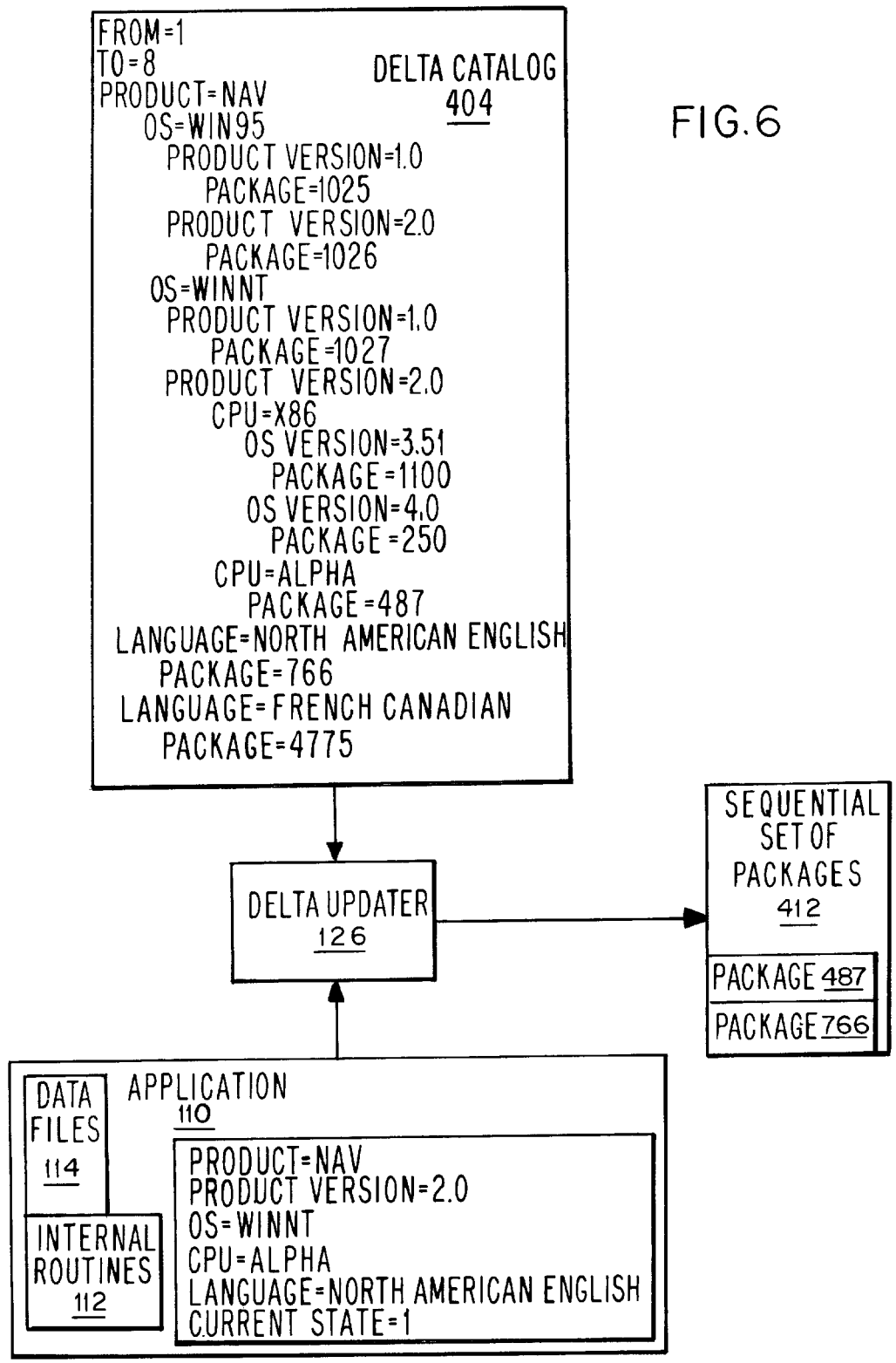
FIG. 6 is an illustration of an updating program 126 using a catalog 404 to determine an appropriate sequential set of update packages 412 based on attributes of an application 110.

An example of a DeltaCatalog contained in a file written to conform to the XML format is given in Appendix B. In the DeltaCatalog file itself, the document type definition for "DPML" is specified by including a uniform resource locator (URL) pointing to the location of a current specification of the document type definition. Alternatively, the data type definition may be included in the file explicitly. A software application to be updated contains the attributes of current state, Product, OS, CPU, and Language, and has access to the desired ending state of the software application, as described below. In order to determine a sequential set of DeltaPackages 122 which need to be applied to the software application to effect the transformation from the current state to the desired ending state, an updating mechanism, referred to as a "DeltaUpdater" is used. The DeltaUpdater may be a separate program, or may be part of the software application itself. It goes through the same basic procedure outlined above, with DeltaCatalogs taking the place of DeltaPackages 122. The DeltaCatalog of the highest tier available which has a "from" field matching the application's current state and which has a "to" field which does not exceed the ending state is selected by the DeltaUpdater. The DeltaCatalog is then processed, with the DeltaUpdater processing only those sub-entries contained within entries with attributes which match those of the application. An example is illustrated in FIG. 6. The DeltaCatalog 404 contains a simplified form of the information contained in the DeltaCatalog file of Appendix B. Application 110 has the attributes of "NAV version 2.0 running on Windows NT on an alpha computer using North American English." The DeltaUpdater 126 would process only Package ID's "487" and "766," as all other Package entries correspond to different attributes. Those DeltaPackages 122 which correspond to these two IDs would then make up a sequential set 412 of DeltaPackages 122 to be applied to application 110 in the order they were encountered in DeltaCatalog 404. When applied to application 110, the DeltaPackages 122 of set 412 transform application 110 from state 1 to state 8, the states given in the "from" and "to" fields of DeltaCatalog 404. If the desired ending state were still later than state 8, then this procedure would again be applied to select and process another Delta-Catalog 404, one which has a "from" value of 8.

DeltaDirectories

A number of transfer mechanisms are available to a DeltaUpdater for retrieving DeltaCatalogs and DeltaPackages 122. Among these are the NNTP Usenet server protocol, available from Internic as "Request For Comments 977"; the HTTP protocol, available from Internic as "Request For Comments 1945"; the FTP protocol, available from Internic as "Request For Comments 959"; and direct access to a "file server" using a protocol such as the Universal Naming Convention (UNC). A file server may be, among other things, internal disk media, removable disk media, or a network resource. Other distribution mechanisms are currently available and more will likely be available in the future. All that is required of a transfer mechanism is that the mechanism be able to supply computer readable data upon request. The present invention utilizes so called "dumb media," meaning that the medium supplying the requested information need not interact with the DeltaUpdater beyond simply supplying requested data. Specifically, "smart servers," such as those used in "push" technology, are not necessary. A smart server determines what update information is necessary, given information about the state of the software application, and then supplies that information. The described transfer mechanisms allow DeltaCatalogs and DeltaPackages 122 to be retrieved from "catalog sources" and "update data sources" on which they are stored.

Figure 7:
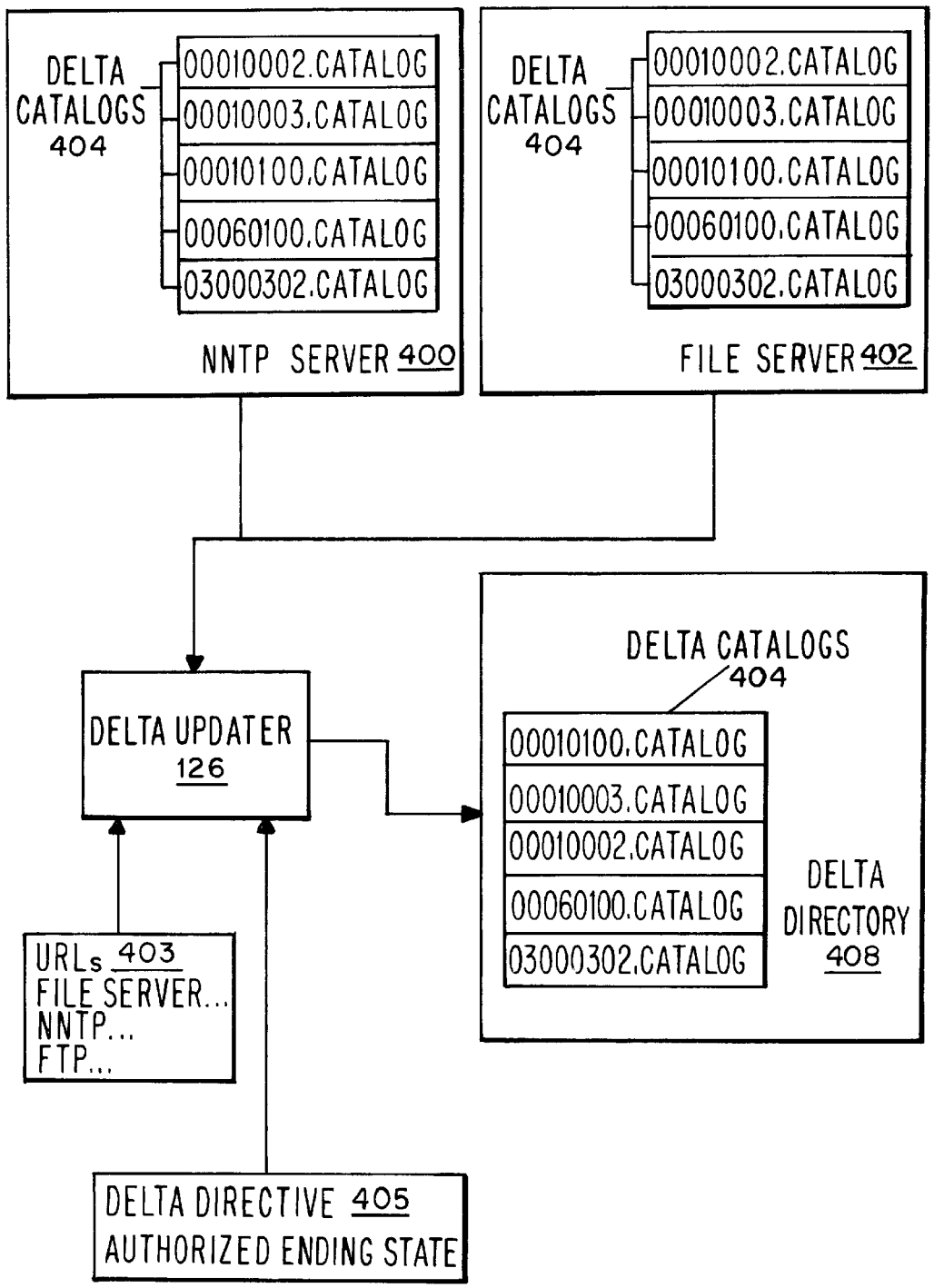
FIG. 7 is an illustration of an updating program 126 constructing a sorted directory 408 of available catalogs 404 from different sources 400 and 402.

A typical system embodying the present invention will have available more than one of the mentioned transfer mechanisms, as illustrated in FIG. 7. A DeltaUpdater 126 will have access to a list 403 of locations, specified as URLs, where needed data may be found. In general, these URLs will specify a number of NNTP news-servers with newsgroups, HTTP servers with directory paths, FTP servers with directory paths, and file servers with directory paths. In the embodiment illustrated in FIG. 7, an NNTP server 400 and a file server 402 contain available DeltaCatalogs 404. The flowchart of FIG. 8 shows the steps carried out by the DeltaUpdater 126. When an update process is begun, the locations specified in list 403 will be polled 502 in order until one is found which contains the required DeltaCatalogs 404. The DeltaUpdater 126 builds a "DeltaDirectory" 408, which is a list of available DeltaCatalogs 404 at the specified location. For transfer mechanisms which support querying of a file directory, such as HTTP, FTP and file servers, the DeltaDirectory 408 is constructed with the information returned by such queries. For these transfer mechanisms, the DeltaCatalog 404 source and destination state information is contained in the name of each DeltaCatalog file. DeltaCatalogs 404 are named according to a scheme where the first four characters specify a source state, the next four characters specify a destination state, and the file extension is "cat." For NNTP, the DeltaUpdater 126 retrieves headers for available messages, and looks for DeltaCatalog 5 information in the headers. The DeltaCatalog information specifies that the message is a DeltaCatalog 404, and specifies the source and destination states are for the DeltaCatalog 404.

After retrieving the source state and destination state for each available DeltaCatalog 404, the DeltaUpdater 126 organizes this information in the DeltaDirectory 408 by sorting 504 the DeltaCatalogs 404 first by source state, and next by reverse destination state. The DeltaCatalogs 404 of the preferred transport mechanism are used, if possible. Otherwise, DeltaCatalogs 404 of alternate transport mechanisms are used. This ordering of the DeltaCatalog 404 information allows the DeltaUpdater 126 to move through the DeltaDirectory 408 efficiently, finding the URL of each DeltaCatalog 404 with the necessary source state, and the farthest destination state which does not exceed the desired ending state. The DeltaUpdater 126 determines 506 the current state of the application to be updated, and the desired ending state of the application. The application can supply its current state to the DeltaUpdater 126, but the DeltaUpdater 126 needs other information to determine the desired ending state. The method by which the DeltaUpdater 126 determines the desire ending state of the application is addressed below.

The sequential set 412 of DeltaPackages 122 is cleared out 508, in preparation for the determination of the set 412. The DeltaUpdater 126 moves through the DeltaDirectory 408 sequentially in the loop comprising steps 510, 512, and 514 to find the first DeltaCatalog 404 in the DeltaDirectory 408 which has the current state as a source state. The DeltaUpdater 126 then moves through the DeltaDirectory 408 from this DeltaCatalog 404 to find the DeltaCatalog 404 which has the farthest destination state which is not beyond the desired ending state (loop 516, 518, and 520). If all of the DeltaCatalogs 404 which have the current state as a source state have a destination state which is beyond the desired ending state, then the update will fail 520.

When a DeltaCatalog 404 is identified at 516 which has a destination state which is not beyond the desired ending state, the DeltaCatalog 404 is requested 524 from the appropriate source 400 or 402. After the requested DeltaCatalog 404 is received 526, the DeltaCatalog 404 is processed 528, as described above, to determine an incremental set of DeltaPackages 122 which are appended to the sequential set 412. The current state of the application is then set 530 to the destination state of this DeltaCatalog 404, and if that state is not the desired ending state 532 the processing continues at step 514, and another DeltaCatalog 404 is determined.

When the full sequential set of DeltaPackages 122 necessary for an update are determined 532, the DeltaUpdater 126 requests 534 each needed DeltaPackage 122. The DeltaUpdater 126 receives 536 the requested DeltaPackages 122 using the appropriate protocol, then uses the digital signature to verify that the DeltaPackages 122 are authentic and have not been altered. Each DeltaPackage 122 retrieved is executed in sequence 538, transforming the application from the beginning state to the desired ending state. In other embodiments, the DeltaUpdater 126 retrieves all of the DeltaPackages 122 specified by a DeltaCatalog 404 before moving on to the next DeltaCatalog 404.

DeltaDirectives

The beginning state of an application update is determined by the DeltaUpdater with reference to the application itself, which will carry some designation of the current state. The desired ending state, however, is not necessarily as easy to identify. One possibility would be for the DeltaUpdater to simply update the application to the latest state for which DeltaCatalogs are available. In many situations, however, it may not be desirable to the user of a software application to update the application to the latest available state. For example, in corporate settings, Information Services departments may wish to test out and verify the stability of a version of a software application before allowing the applications owned by the corporation to be updated to that version. This is often the case when the update is a major revision. Also, some networked computer systems may require that all copies of a particular application be at exactly the same state. One solution would be for an Information Services department to control the availability of DeltaCatalogs 404. Alternatively, it is desirable in some situations to utilize "DeltaDirectives," which are issued in connection with a given computer or network, specifying to which destination state an update is allowed. A DeltaDirective is a file or NNTP message containing a single value, the allowed destination state. The filename or NNTP message header identifies the file or NNTP message as a DeltaDirective. The location for such DeltaDirectives is made available to the DeltaUpdater before the update procedure is begun. As illustrated in FIG. 7, the DeltaUpdater 126 identifies the latest available DeltaDirective 405 in the prescribed location, obtains the DeltaDirective 405, and reads the desired ending state from it. This desired ending state is used by the DeltaUpdater 126 in steps 506, 516, and 532 of FIG. 8. The publisher of the updates may make available general DeltaDirectives 405 which specify the latest available state. The DeltaUpdater for any given computer may be set to look to the DeltaDirectives 405 issued by the software publisher or those issued by some other authority, such as an Information Services department.

The above description is included to illustrate the operation of the preferred embodiments and is not meant to limit the scope of the invention. The scope of the invention is to be limited only by the following claims. From the above description, many variations will be apparent to one skilled in the art that would yet be encompassed by the spirit and scope of the present invention.

APPENDIX A

DPML.DTD

```
<?XML version="1.0"?>
<!DOCTYPE DeltaCatalog [
<!ELEMENT DeltaCatalog (Product | Package | OS | CPU | Language)*>
<!ATTLIST DeltaCatalog from CDATA #IMPLIED>
<!ATTLIST DeltaCatalog to CDATA #REQUIRED>
<!ELEMENT Product (Product | Package | OS | CPU | Language)*>
<!ATTLIST Product name CDATA #IMPLIED>
<!ATTLIST Product version CDATA #IMPLIED>
<!ATTLIST Product ID CDATA #IMPLIED>
<!ATTLIST Product maxversion CDATA #IMPLIED>
<!ATTLIST Product minversion CDATA #IMPLIED>
<!ELEMENT OS (Product | Package | OS | CPU | Language)*>
<!ATTLIST OS name CDATA #IMPLIED>
<!ATTLIST OS version CDATA #IMPLIED>
<!ATTLIST OS maxversion CDATA #IMPLIED>
<!ATTLIST OS minversion CDATA #IMPLIED>
<!ELEMENT CPU (Product | Package | OS | CPU | Language)*>
<!ATTLIST CPU name CDATA #IMPLIED>
<!ELEMENT Language (Product | Package | OS | CPU | Language)*>
<!ATTLIST Language name CDATA #IMPLIED>
<!ATTLIST Language locale CDATA #IMPLIED>
<!ELEMENT Package EMPTY>
<!ATTLIST Package ID CDATA #REQUIRED>
]>
```

APPENDIX B

CATALOG.CAT

```
<?XML version="1.0" ?>
<!DOCTYPE DeltaCatalog system "http://www.symantec.com/DPML.DTD">
<DeltaCatalog from="1" to="8">
    <Product name="NAV" ID="12345">
        <OS name="Win95">
            <Product version="1.0">
                <Package ID="1025">
            </Product>
            <Product version="2.0">
                <Package ID="1026">
            </Product>
        </OS>
        <OS name="WinNT">
            <Product version="1.0">
                <Package ID="1027">
            </Product>
            <Product version="2.0">
                <CPU name="x86">
                    <OS vesion="3.51">
                        <Package ID="1100">
                    </OS>
                    <OS version="4.0">
                        <Package ID="250">
                    </OS>
                </CPU>
                <CPU name="Alpha">
                    <Package ID="487">
                </CPU>
            </Product>
        </OS>
        <Language name="English" locale="NorthAmerica">
            <Package ID="766">
        </Language>
        <Language name="French" locale="Canada">
            <Package ID="4775">
        </Language>
    </Product>
</DeltaCatalog>
```

We claim:

1. A system for transforming a computer readable file of a beginning state to a computer readable file of an ending state, where the beginning state and the ending state are both states within a sequence of states associated with the computer readable file, the system comprising:

at least two update patches, each update patch having a first state and a second state associated therewith, the first state and the second state of each update patch being states within the sequence of states, the first state of each update patch preceding in the sequence of states the second state of that update patch, and each update patch specifying information about differences between the first state and the second state associated with that update patch;

at least one update data source, each update data source having access to at least one of the update patches, each update data source being disposed to receive a request which is associated with one of the update patches, for transmitting the update patch associated with the request; and a client coupled to each update data source and having access to the computer readable file, disposed to receive transmitted update patches from each update data source, for determining a sequential set of update patches which specify information for transforming the computer readable file from the beginning state to the ending state.

2. The system of claim 1, wherein:

the ending state is specified by a directive file available to the client.

3. The system of claim 1, wherein:

at least one update data source is selected from the group consisting of an NNTP Usenet server, an HTTP server, an FTP server, and a file system server which is locally accessible to the client.

4. The system of claim 1, wherein:

the update patches are binary patches which include binary differences between the first state and the second state.

5. The system of claim 1, wherein:

the sequential set contains that number of update patches which is the smallest number of accessible update patches necessary for the client to transform the computer readable file from the beginning state to the ending state.

6. The system of claim 1, wherein:

each update patch has a tier associated with it, the tier being a number which corresponds to the number of states between the first state and the second state associated with the update patch; and at least one of the update patches has a tier which is different from the tier of another update patch.

7. The system of claim 6, wherein:

the client transmits a request associated with each update patch of the sequential set to the update data source which has access to that update patch, receives each requested update patch from the update data source which has access to the requested update patch, and updates the computer readable file from the beginning state to the ending state with the update patches received; and the update patches are binary patches which include binary differences between the first state and the second state.

8. The system of claim 1, wherein:

the client transmits a request associated with each update patch of the sequential set of update patches to the update data source which has access to that update patch, receives each requested update patch from the update data source which has access to the requested update patch, and updates the computer readable file from the beginning state to the ending state with the update patches received.

9. The system of claim 8, wherein:

at least one of the update patches is a catalog which specifies at least one other file which specifies information about differences between two states.

10. The system of claim 9, wherein:

each catalog has a tier associated with it, the tier being a number which corresponds to the number of states between the first state and the second state associated with the catalog; and at least one of the catalogs has a tier which is different from the tier of another catalog.

11. The system of claim 10, wherein:

the ending state is specified by a directive file available to the client.

12. The system of claim 8, wherein:

at least one of the update patches is a catalog which specifies at least one binary patch file which includes information about binary differences between two states.

13. The system of claim 12, wherein:

each catalog has a tier associated with it, the tier being a number which corresponds to the number of states between the first state and the second state associated with the catalog; and at least one of the catalogs has a tier which is different from the tier of another catalog.

14. The system of claim 13, wherein:

the ending state is specified by a directive file available to the client.

15. A computer implemented method for transforming a computer readable file of a beginning state to a computer readable file of an ending state using available update patches, the beginning state and the ending state both being states within a sequence of states associated with the computer readable file, each update patch having a first state and a second state associated therewith, the first state of each update patch preceding in the sequence of states the second state of that update patch, and each update patch specifying information about differences between the first state and the second state associated with that update patch, the computer implemented method comprising the steps of:

determining a sequential set of update patches from those available such that the first state associated with the initial update patch in the sequential set of update patches is the beginning state, the first state associated with each other update patch in the sequential set of update patches is the same state as the second state associated with the preceding update patch in the sequential set of update patches, and the second state associated with the final update patch in the sequential set of update patches is the ending state;

requesting each update patch in the sequential set of update patches from at least one update data source, wherein each update data source has access to at least one of the available update patches, and is disposed to receive the request and transmit the requested update patch;

receiving each requested update patch in the sequential set of update patches from at least one update data source; and producing a computer readable file of the ending state by using each update patch in the sequential set of update patches to transform the computer readable file from the first state associated with the update patch to the second state associated with the update patch.

16. The method of claim 15, wherein:

the ending state is specified by a directive file.

17. The method of claim 15, wherein:

at least one update data source is selected from the group consisting of an NNTP Usenet server, an HTTP server, an FTP server, and a locally accessible file system server.

18. The method of claim 15, wherein:

the update patches are binary patches which include binary differences between the first state and the second state.

19. The method of claim 15, wherein:

the sequential set of update patches contains that number of update patches which is the smallest number of available update patches necessary to transform the computer readable file from the beginning state to the ending state.

20. The method of claim 15, wherein:

the step of determining the sequential set of update patches comprises:

determining a sequential set of catalogs from available catalogs, each catalog specifying at least one update patch;

interpreting each catalog of the sequential set of catalogs seriatim to determine an incremental set of update patches associated with the catalog; and combining the incremental sets of update patches.

21. The method of claim 15, wherein:

each update patch has a tier associated with it, the tier being a number which corresponds to the number of states between the first state and the second state associated with the update patch; and at least one of the update patches has a tier which is different from the tier of another update patch.

22. A computer readable medium containing a computer program which transforms a computer readable file of a beginning state to a computer readable file of an ending state using available update patches, the beginning state and the ending state both being states within a sequence of states associated with the computer readable file, each update patch having a first state and a second state associated therewith, the first state of each update patch preceding in the sequence of states the second state of that update patch, each update patch specifying information about differences between the first state and the second state associated with that update patch, each update patch having a tier associated with it, the tier being a number which corresponds to the number of states between the first state and the second state associated with the update patch, and at least one of the update patches has a tier which is different from the tier of another update patch, the computer program performing the steps of:

determining a sequential set of update patches from those available such that the first state associated with the initial update patch in the sequential set of update patches is the beginning state, the first state associated with each other update patch in the sequential set of update patches is the same state as the second state associated with the preceding update patch in the sequential set of update patches, and the second state associated with the final update patch in the sequential set of update patches is the ending state;

requesting each update patch in the sequential set of update patches from at least one update data source, wherein each update data source has access to at least one of the available update patches, and is disposed to receive the request and transmit the requested update patch;

receiving each requested update patch in the sequential set of update patches from at least one update data source; and producing a computer readable file of the ending state by using each update patch in the sequential set of update patches to transform the computer readable file from the first state associated with the update patch to the second state associated with the update patch.

* * * * *